Feb. 6, 1934.  J. W. BROWN, JR  1,946,420
INDEXED CAM CONTROLLED CLAMPING JIG
Filed Nov. 8, 1930  4 Sheets-Sheet 4
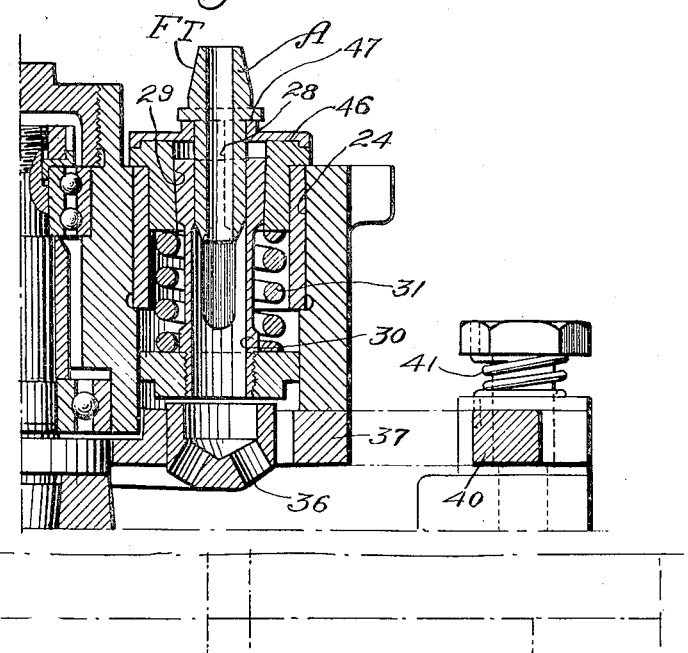
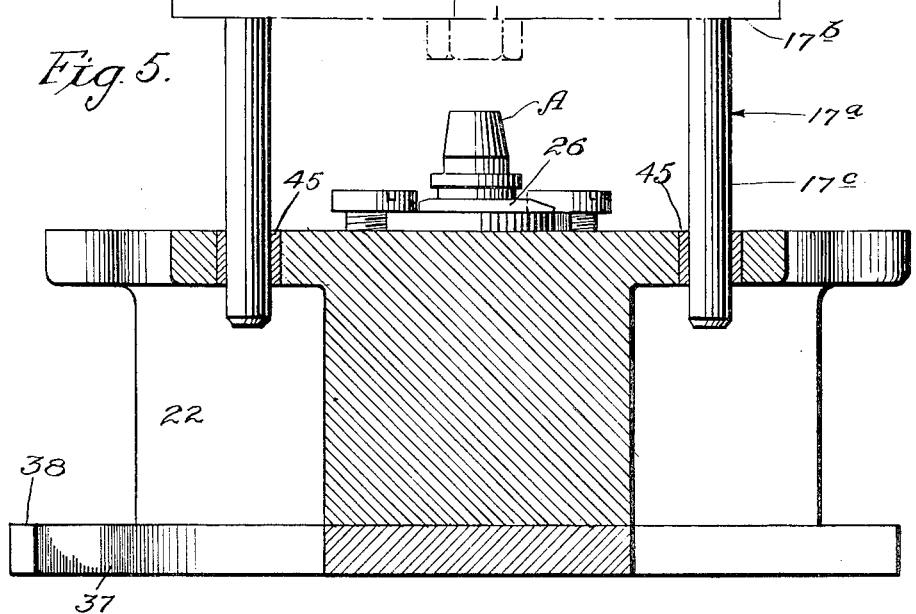
Inventor:
John W. Brown Jr.
by his Attorneys
Howson & Howson Patented Feb. 6, 1934

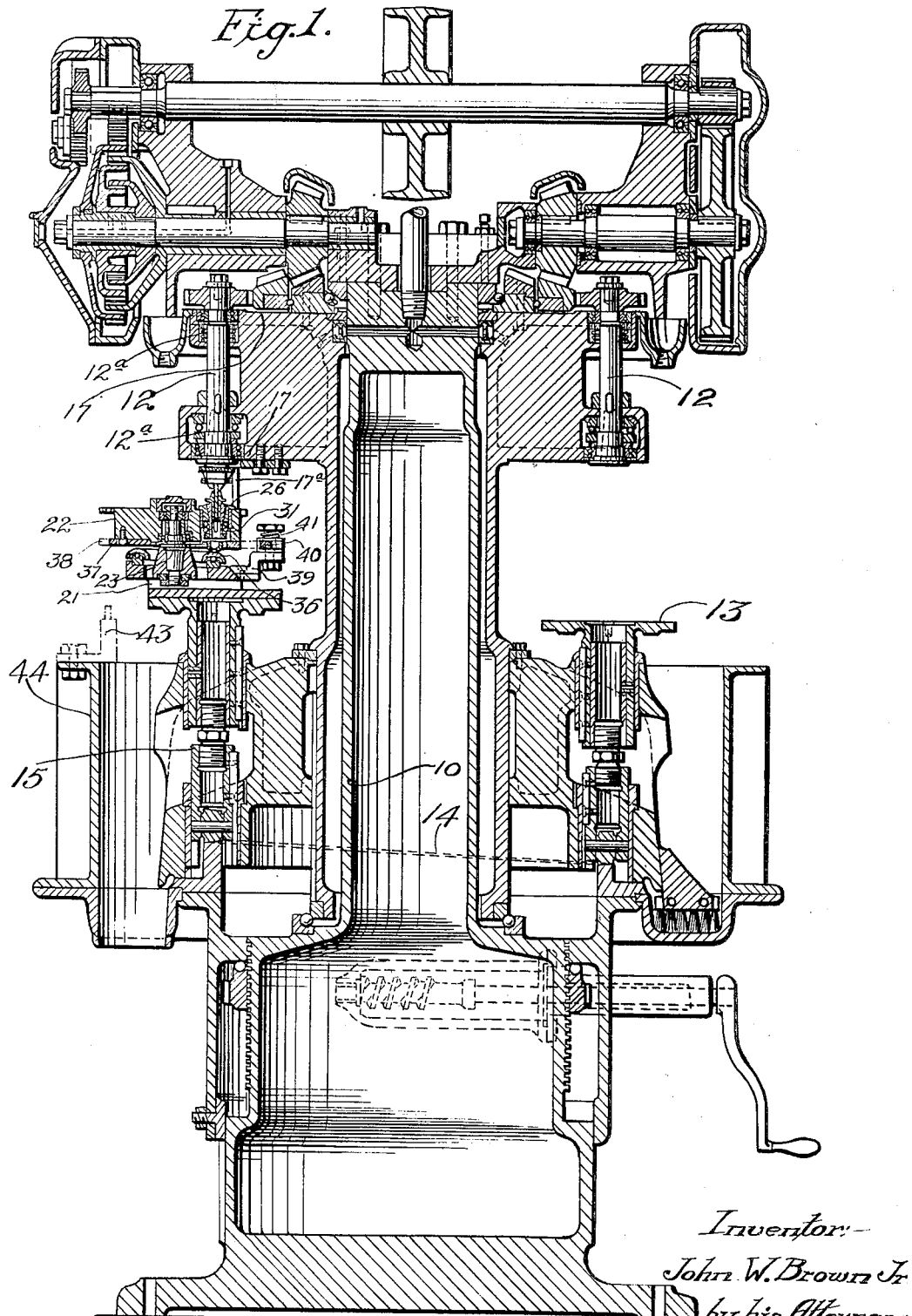

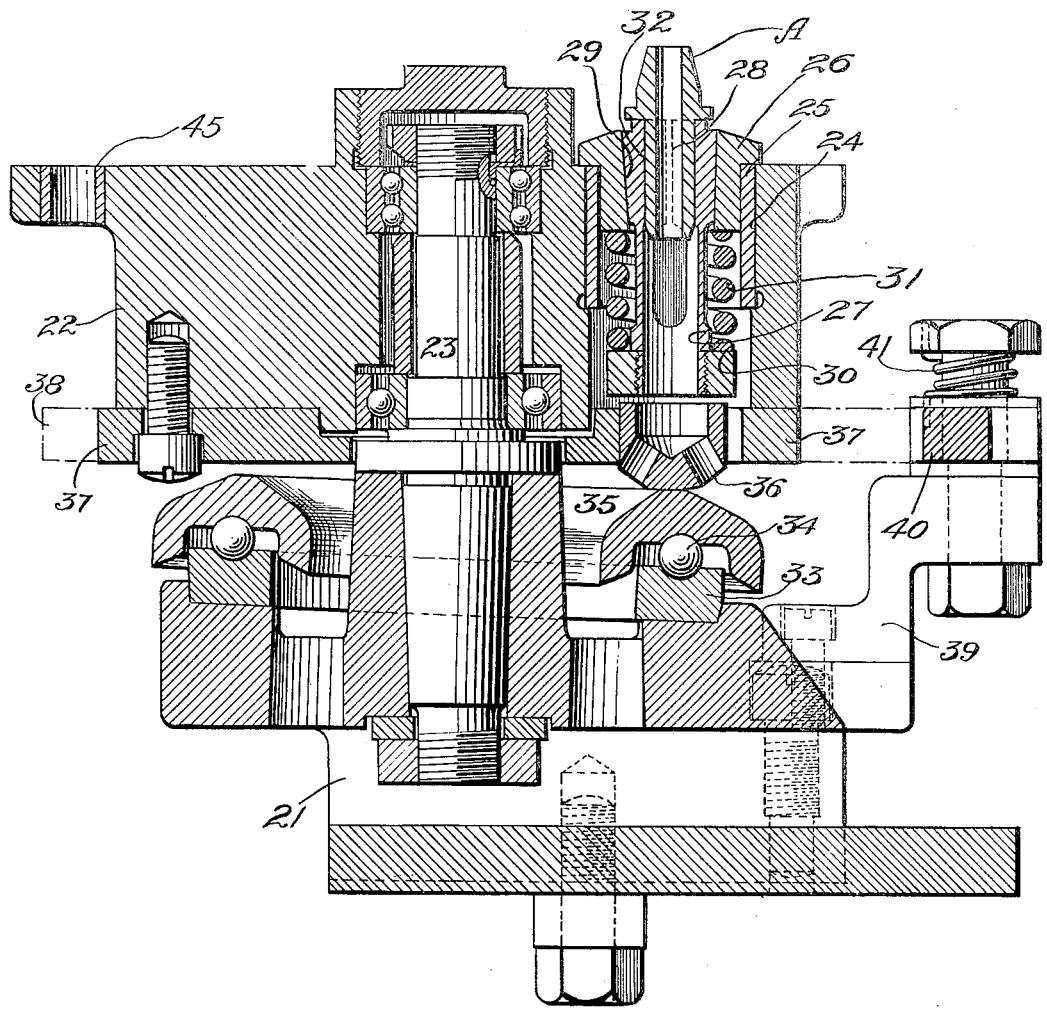

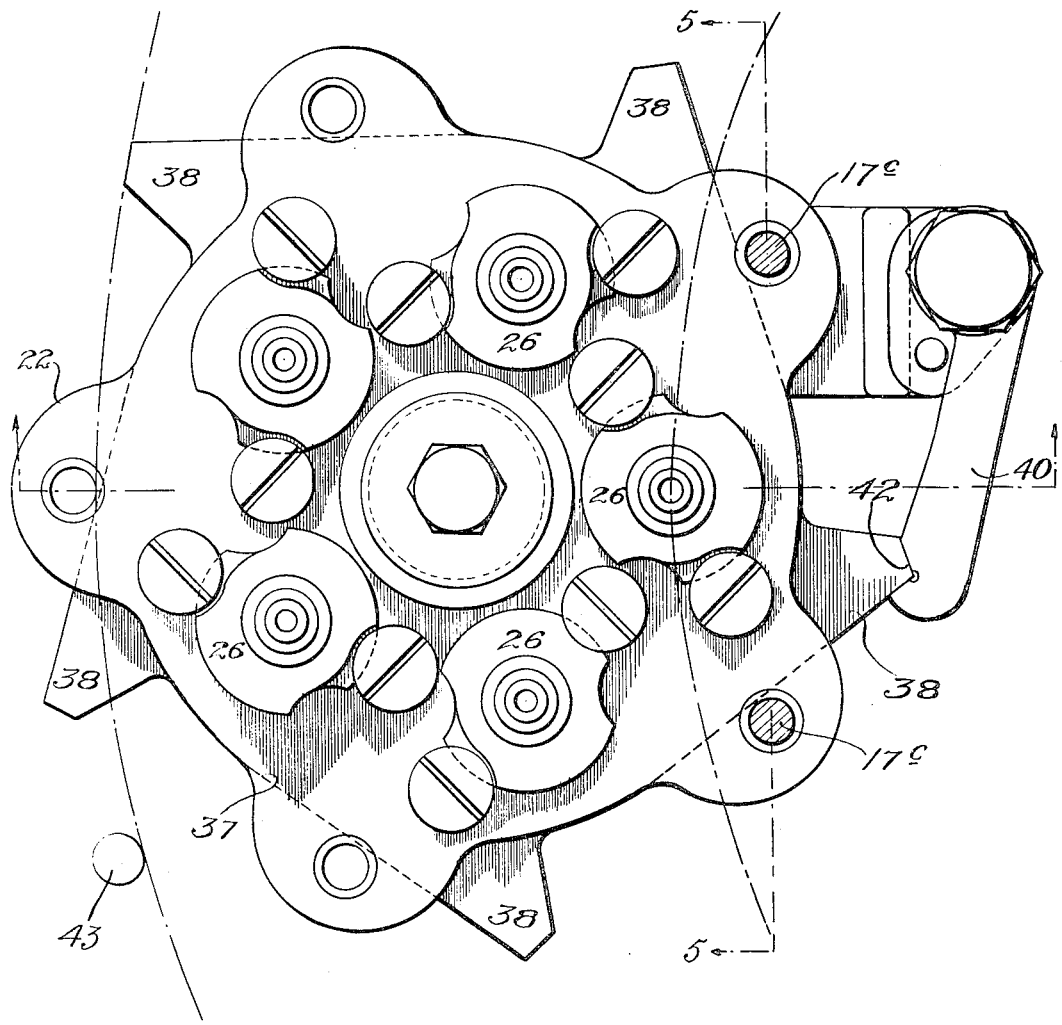

1,946,420

UNITED STATES PATENT OFFICE 1,946,420

INDEXED CAM-CONTROLLED CLAMPING JIG

John Wilson Brown, Jr., Philadelphia, Pa.

Application November 8, 1930. Serial No. 494,434

3 Claims. (Cl. 77—23)

This invention relates to jigs for cutting machines, and more particularly to a jig for rotary cutting machines of the type illustrated in my prior Patent No. 1,467,526 granted September 11, 1923 for Drilling machine.

In a machine of the type illustrated in said patent a rotatable carrier supports a plurality of drill or cutter spindles and a plurality of associated work tables while said carrier is being rotated about an axis. Associated with the carrier and more particularly with a support and guide for the carrier is a means, which may take any one of a number of forms, for elevating and depressing the work tables so that the work may be brought into conjunction with the drilling or cutting implements carried by the spindles.

An important object of the present invention is the provision of a jig for use with a machine of this character so arranged that a plurality of similar articles may be supported from each work table and successively presented to the associated drill or cutting mechanism as the carrier is rotated.

A further object of the invention is the provision of a jig of this character so constructed that the individual articles carried thereby are automatically locked against movement as they approach the cutter-engaging position, and are released as they recede from this cutter-engaging position so that they may be withdrawn and substituted for by a further similar article on which the operation is to be performed.

A further and more specific object of the invention is the provision of a rotatable jig for use in machines of this character having a plurality of sockets to receive work, each socket including a clutch and the jig embodying means operating automatically during rotation thereof to alternately render the clutches operative and inoperative so that the work may be held against movement when engaged by cutting mechanism and disengaged for removal and substitution after the cutting operation has been performed.

A still further object of the invention is to produce an apparatus of this character so constructed that frictional forces resisting operation are reduced to a minimum.

These and other objects I attain by the construction shown in the accompanying drawings wherein, for the purpose of illustration, I have shown a preferred embodiment of my invention and wherein:

Fig. 1 is a vertical sectional view through a rotary drilling machine employing a jig constructed in accordance with my invention;

Fig. 2 is an enlarged vertical sectional view through the jig;

Fig. 3 is a plan view of the jig;

Fig. 4 is a fragmentary sectional view through a slightly modified form of jig; and Fig. 5 is a detailed sectional view showing the manner of centering the jig during the drilling operation.

Referring now more particularly to the drawings, the numeral 10 generally designates a stationary standard, and 11 a carrier rotatable thereabout. The carrier supports a plurality of spindles 12 and a plurality of work tables 13, there being a table 13 aligned with each spindle, and the tables 13 being mounted for vertical movement. Vertical movement is imparted to the work tables during rotation of the carrier about the standard through any suitable medium, that at present illustrated being a cam 14 carried by the standard and engaging the lower ends of the work table standards 15. By the construction shown, the work tables are caused to rise and fall once for each rotation of the carrier although, as illustrated in my copending application, Ser. No. 483,952, filed September 23, 1930 for Multiple operation multiple spindle drills, the work tables may be caused to rise and fall any desired number of times during a single rotation of the carrier. The mountings for the spindles 12 preferably comprise bearings 12—a mounted in flanges 17 projecting outwardly from the carrier. Each spindle has associated therewith a guide 17—a this guide being at present shown as comprising a bracket 17—b secured to the under surface of the lower flange and having downwardly projecting pins 17—c. The structure just described is usual in one or more of a number of modified forms in substantially all constructions and arrangements of the machine set forth in the patent above identified and forms no portion of the present invention except in combination with the structure hereafter recited.

In accordance with the present invention, I mount upon each work table 13 a jig comprising a stator 21 and a rotor 22 connected by a vertical pivot shaft 23, the rotor 22 being arranged uppermost and being preferably mounted on ball bearings surrounding the shaft 23 as indicated. The rotor has formed therethrough a plurality of vertical sockets 24 arranged upon the same circumference and each socket mounts, preferably through a bushing 25, a stationary element 26 of a clutch-type clamp. The movable part of this clamp comprises a substantially cylindrical body portion 27, the upper end of which is vertically slit at two or more points 28 to form sections which may converge upon or separate from one another to clamp an article arranged within the bore of the cylinder. The exterior of the upper end of the movable part tapers downwardly as indicated at 29 and fits within a tapered bore formed in the stationary part 26. The lower end of the body is provided with an upwardly-facing shoulder 30 and between this shoulder and the lower end of the stationary part a heavy spring 31 surrounds the cylindrical body and constantly urges this body downwardly so that the wedging action of the tapered wall 29 against the wall of the bore in which it is seated will cause the fingers to converge.

The fingers are constructed to have a normal tendency to expand so that when the movable part is elevated against the action of spring 31, these fingers separate and the effective size of the bore 32 of the movable part increases and an article may be readily inserted therein. If the resistance to spring 31 is then removed, the article will be clamped and firmly held. The upper surface of the stator is disposed at least in part at an angle to the axis of the shaft 23 other than a right angle. This part is at present shown as in the form of a ball race 33 having seated thereon through a series of balls 34 an upper race member 35 which may be termed a cam ring. This cam ring engages the lower ends of the movable elements of the clutches through the major portion of rotation of rotor 22, releasing therefrom only through a short period of such rotation and at a time when the article held in the clutch mechanism is just coming into or moving out of alignment with the cutting mechanism supported in the associated spindle 12. The engagement between the lower end of the clutch elements and the cam ring 35 may be direct, but is preferably through an interponent 36 in the form of a plunger slidably mounted in the rotor.

While this mounting may be directly in the body of the rotor, I have shown these interponents as actually mounted in openings formed in a star plate 37 secured to the lower face of the rotor and provided with projecting fingers 38. The stator, through medium of a bracket 39, supports a horizontally swinging arm 40 constantly urged inwardly by a spring 41 and having at its free end a notch 42 to receive the outer ends of fingers 38. These fingers may disengage from this notch upon application of sufficient pressure in rotation of rotor 22 to overcome the action of spring 41 and cause the arm 40 to be withdrawn. Arm 40 in its co-action with fingers 38 constitutes a tentative positioning device which will hereinafter more fully appear.

Rotation of rotor 22 is accomplished through an index pin 43 which is preferably carried by a stationary guard 44 surrounding the lower portion of the rotatable carrier and is positioned to come in contact with the fingers as the cutting mechanism 16 carried by the spindles disengages from the articles. As a means for positively centering the rotor 22 I provide this rotor with openings 45 adapted to align with the pins 17—c the lower ends of which are slightly tapered. When the table rises, the lower ends of these pins enter the openings 45, the taper of the pins allowing for slight variations in alignment and as the work table rises rotate the rotor until it is perfectly aligned.

It will be obvious that in some instances it is desirable that the vertical position of the member being operated on by the cutter 16 be accurately determined. Referring to Fig. 4, it will be noted that the vertical position of the article "A" disposed therein is extremely important if the thickness of the flange "F" thereof in the finished article is important, or if this flange must bear a certain relation to the taper "T" of the article. Under such circumstances, instead of employing the movable element 27 of the clutch as a seat for the article "A" I provide a fixed seat therefor. This may be readily accomplished by abbreviating the fingers of the movable element as suggested in this figure and then providing a cap 46 seating upon the stationary element 26 and providing a seat as at 47 for the article "A".

It will be obvious that with a structure of this character the articles "A" may be inserted in the jig at any point in the rotation of the machine where it is desired that the operator stand, for any clutch element which is outwardly disposed and, accordingly, accessible to the operator will have the sections thereof in such position that a finished article may be removed and a new article substituted therefor. It will be noted that since the ring 35 rotates with rotor 22 it is, in effect a portion of this rotor which, while it rotates in synchronism with the rotor, likewise oscillates so that the releasing action through interponents 36 may be had at the desired period. It will further be noted that the control of the releasing action is embodied in the stator and more particularly in the actual cam formed by the lower race member 33.

While I have hereinbefore referred to movement of the table with relation to the cutter or drill, it will, of course, be obvious that this movement can be reversed; that is to say, instead of moving the table longitudinally of the carrier the drill could be correspondingly moved to effect the approach of the cutting tool and the work.

Since the construction illustrated is, obviously, capable of a considerable range of change and modification without departure from the spirit of my invention, I do not wish to be understood as limiting myself thereto except as hereinafter claimed.

I claim:

1. In combination, a rotary cutting tool, a work table movable toward and away from the cutting tool, a jig carried by said table including a rotor and a stator, a plurality of work-holding chucks carried by the rotor and arranged upon the same circumference, each of said chucks including a work clamping element, means for periodically rotating the rotor to successively align said work-holding chucks with the cutting tool, cam means controlling operation of the chucks to lock each chuck in its work-gripping position as it aligns with said cutting tool, means for bodily rotating the cutting tool and the work table about a common axis, and means operated by rotation of the cutting tool and work table about said axis for moving the work table toward and away from the cutting tool.

2. In combination, a rotary cutting tool, a work table movable toward and away from the cutting tool, a jig carried by said table including a rotor and a stator, a plurality of work-holding chucks carried by the rotor and arranged upon the same circumference, each of said chucks including a work clamping element, means for periodically rotating the rotor to successively align said work-holding chucks with the cutting tool, means to lock each chuck in its work-gripping position as it aligns with the cutting tool, means for bodily rotating the cutting tool and the work table about a common axis, and means operated by rotation of the cutting tool and work table about said axis for moving the work table toward and away from the cutting tool.

3. In combination, a member rotatable about its own axis, means for bodily rotating the member about a second axis, means for rotating the member upon its own axis as it is rotated about said second axis, means for reciprocating the member in the direction of said second axis, means on the member at points circumferentially-spaced about its axis for holding articles to be operated on, a cutting implement rotatable about the second axis with the member for operating on such articles during one period of the reciprocation of the member, said member being formed in two sections, means for oscillating one of the sections as it rotates, and means for moving the article-holding means of the member from article-holding to article-releasing positions actuated by oscillation of said part.

JOHN WILSON BROWN, Jr.